United States Patent
Suzuki et al.

(10) Patent No.: US 6,954,714 B2
(45) Date of Patent: *Oct. 11, 2005

(54) SYSTEM AND ASSOCIATED METHOD FOR MEASURING COMMUNICATION DATA VOLUME AND TYPE THEREOF

(75) Inventors: Hideharu Suzuki, Kanagawa (JP); Hiromitsu Sumino, Kanagawa (JP); Norihiro Ishikawa, Kanagawa (JP); Hidetoshi Ueno, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/333,738
(22) PCT Filed: Apr. 9, 2002
(86) PCT No.: PCT/JP02/03543
§ 371 (c)(1), (2), (4) Date: Jan. 28, 2003
(87) PCT Pub. No.: WO02/084955
PCT Pub. Date: Oct. 24, 2002

(65) Prior Publication Data
US 2003/0108057 A1 Jun. 12, 2003

(30) Foreign Application Priority Data
Apr. 9, 2001 (JP) ........................................ 2001-110024

(51) Int. Cl.[7] .............................................. G06F 15/00
(52) U.S. Cl. ........................ 702/182; 702/182; 702/127; 702/189; 370/230; 370/234; 370/252; 705/64; 705/77; 700/28; 700/89; 709/203; 709/206; 340/853.1
(58) Field of Search ................................ 702/127–128, 702/179.1, 82, 187–190; 705/64, 77; 700/8, 28, 89; 709/203, 204; 340/853.1; 370/232–234

(56) References Cited
U.S. PATENT DOCUMENTS 6,377,993 B1 * 4/2002 Brandt et al. ............... 709/227
6,385,644 B1 * 5/2002 Devine et al. .............. 709/206
6,765,873 B1 * 7/2004 Fichou et al. ............... 370/235
2002/0055917 A1 * 5/2002 Muraca ......................... 707/1
2002/0111139 A1 * 8/2002 Nishiyama et al. ........... 455/41
2003/0204756 A1 * 10/2003 Ransom et al. .............. 713/300

FOREIGN PATENT DOCUMENTS

| JP | 11-74882 | 3/1999 |
| JP | 11-224239 | 8/1999 |
| JP | 2000-252979 | 9/2000 |
| JP | 2000-307574 | 11/2000 |

OTHER PUBLICATIONS

Nishikawa et al., 'Design and Implementation of Video Server for Mixed-rate Streams', Jan. 1997, IEEE Article, pp. 3–11.*
Cooley et al., 'Grouping Web Page Reference into Transactions for Mining World Wide Web Browsing Patterns', Dec. 1997, IEEE Article, pp. 2–9.*

* cited by examiner

Primary Examiner—Patrick Assouad
Assistant Examiner—Elias Desta
(74) Attorney, Agent, or Firm—Oblon, Spivak, McClelland, Maier & Neustadt, P.C.

(57) ABSTRACT

It is an object of the invention to measure a communication data volume for each service type in measuring a communication data volume in a charging process and the like. The invention comprises a plurality of measuring points 131 to 133 for measuring a communication data volume and a data relaying apparatus 120 for transmitting received data to any of the plurality of measuring points 131 to 133. The data relaying apparatus 120 has a service-type judging means 121 for judging the service type of the received data, a measuring point determining means 122 for determining the measuring points 131 to 133 to which the data is to be transmitted based on the service type and a data transmission means 122 for transmitting the data to the measuring point thus determined, and each of the plurality of measuring points 131 to 133 has a communication data measuring means for measuring the communication data volume of the data received from the data relaying apparatus 120.

13 Claims, 11 Drawing Sheets

FIG.7A

SERVICE TYPE INFORMATION

| 1 | ××× | ×××××××× |

FIG.7B

SERVICE TYPE INFORMATION

| 3 | ××× | ×××××××× |

FIG.7C

SERVICE TYPE INFORMATION

| 2 | A B C | D E F G H I J K |

CONTENTS PROVIDER IDENTIFICATION INFORMATION

CONTENTS IDENTIFICATION INFORMATION

SYSTEM AND ASSOCIATED METHOD FOR MEASURING COMMUNICATION DATA VOLUME AND TYPE THEREOF

TECHNICAL FIELD

The invention relates to a communication data volume measuring system, a communication data volume measuring method, a data (e.g., packet) relaying apparatus, a data relaying method, a program, and a recording medium used in a billing process.

BACKGROUND ART

FIG. 1 is a general configuration diagram of a conventional communication data volume measuring system. A conventional method for billing will now be described with reference to FIG. 1.

As shown in FIG. 1, the conventional communication data volume measuring system comprises contents servents 11, 12 that provide contents, a gateway 20, a charging (measuring) point 30, a charhe server 40, and clients 51 to 53.

For example, let us assume that the contents server 11 provides contents to the client 51 through packet communication. The contents server 11 includes in a packet information such as the destination (client 51) and transmits the packet to the gateway 20. The packet transmitted to the gateway 20 is then transmitted to the charging point 30 that in turn transmits it to the client 51. The billing point 30 measures (counts) a packet level communication data volume. That is, the charging point 30 measures the communication data volume of the relayed packet in order to charge for only the relayed packet. The measured value is transmitted to the charge server 40, and the charge service 40 performs a process of billing the measured value thus received.

Referring to charge types, some billings are made to clients (end users), and others are made to servers (contents servers) in accordance with the service type. In the latter case, more specifically, charging may be made separately by each of a plurality of contents servers e.g., companies A and B or maybe made separately for each of a plurality of service types.

However, according to the conventional method of billing shown in FIG. 1, since the billing point 30 cannot interpret data at application level, it cannot identify to which service type the data of each packet belongs.

It is an object of the invention to measure the communication data volume for each service type when measuring communication data volumes in a billing process.

DISCLOSURE OF INVENTION

In order to achieve the above object, a communication data volume measuring system is provided having a plurality of measuring points for measuring a communication data volume and a data relaying apparatus for receiving data and transmitting the data to any of the plurality of measuring points. The data relaying apparatus has a service-type judging means for judging the service type of the received data, a measuring point determining means for determining the measuring point to which the data is to be transmitted from among the plurality of measuring points based on the service type, and a data transmission means for transmitting the data to the determined measuring point; and the fact that each of the plurality of measuring points has a data receiving means for receiving the data from the data relaying apparatus and a communication data volume measuring means for measuring the communication data volume of the received data.

The data relaying apparatus has a server for transmitting the data; the server has an adding means for adding an HTTP extension header indicating the service type of the data; and the service-type judging means of the data relaying apparatus judges the service type based on the HTTP extension header added to the received data.

The data is transmitted through a secure communication, the adding means of the server adds an HTTP extension header indicating a service type to data transmitted in response to an HTTP signal requesting the start of the secure communication.

A data relaying apparatus is provided in a communication data volume measuring system having a plurality of measuring points for measuring a communication data volume and a data relaying apparatus for receiving data and transmitting the data to any of the plurality of measuring points. The data relaying apparatus has a service-type judging means for judging the service type of the received data, a measuring point determining means for determining the measuring point to which the data is to be transmitted from among the plurality of measuring points based on the service type, and a data transmission means for transmitting the data to the determined measuring point.

A data relaying apparatus is provided for transmitting and receiving data and measuring a communication data volume. A service-type judging means judges the service types of the received data, a communication data volume measuring means for measuring the communication data volume of the received data for each of the service types, and a data transmission means for transmitting the data.

A communication data volume measuring method is provided in a communication data volume measuring system having a plurality of measuring points for measuring a communication data volume and a data relaying apparatus for receiving data and transmitting the data to any of the plurality of measuring points. The method has the steps of: A) judging the service type of the received data; B) determining the measuring point to which the data is to be transmitted from among the plurality of measuring points based on the service type at the data relaying apparatus; C) transmitting the data to the determined measuring point from the data relaying apparatus; and D) measuring the communication data volume of the received data at the determined measuring point.

An HTTP extension header may be added in a further embodiment indicating the service type of said data at a server transmitting said data to said data relaying apparatus, and the data relaying apparatus judges the service type based on the HTTP extension header added to the data.

When the data is transmitted through a secure communication, in a further embodiment, the server adds an HTTP extension header indicating a service type to data transmitted in response to an HTTP signal requesting the start of the secure communication.

A data relaying method in a communication data volume measuring system is provided having a plurality of measuring points for measuring a communication data volume and a data relaying apparatus for receiving data and transmitting the data to any of the plurality of measuring points. The method has the steps of: F) judging the service type of the received data; G) determining the measuring point to which the data is to be transmitted from among the plurality of measuring points based on the service types; and H) transmitting the data to the determined measuring point.

A data relaying method in a data relaying apparatus for transmitting and receiving a data and measuring communication data volume. The method has the steps of: I) judging the service type of the received data; J) measuring the communication data volume of the received data foe each of the service types; and K) transmitting the data.

The above inventions make it possible to perform measurement on each service type when measuring communication data volumes in a billing process.

BRIEF DESCRIPTION OF THE DRAWINGS

FIG. 7 shows an example of an HTTP extension header used in the communication data volume measuring system in the second embodiment of the invention;

BEST MODE FOR CARRYING OUT THE INVENTION

[Modes for Carrying out the Invention]

Embodiments of the invention will now be described in detail with reference to the drawings.

(First Embodiment)

Figure 1:
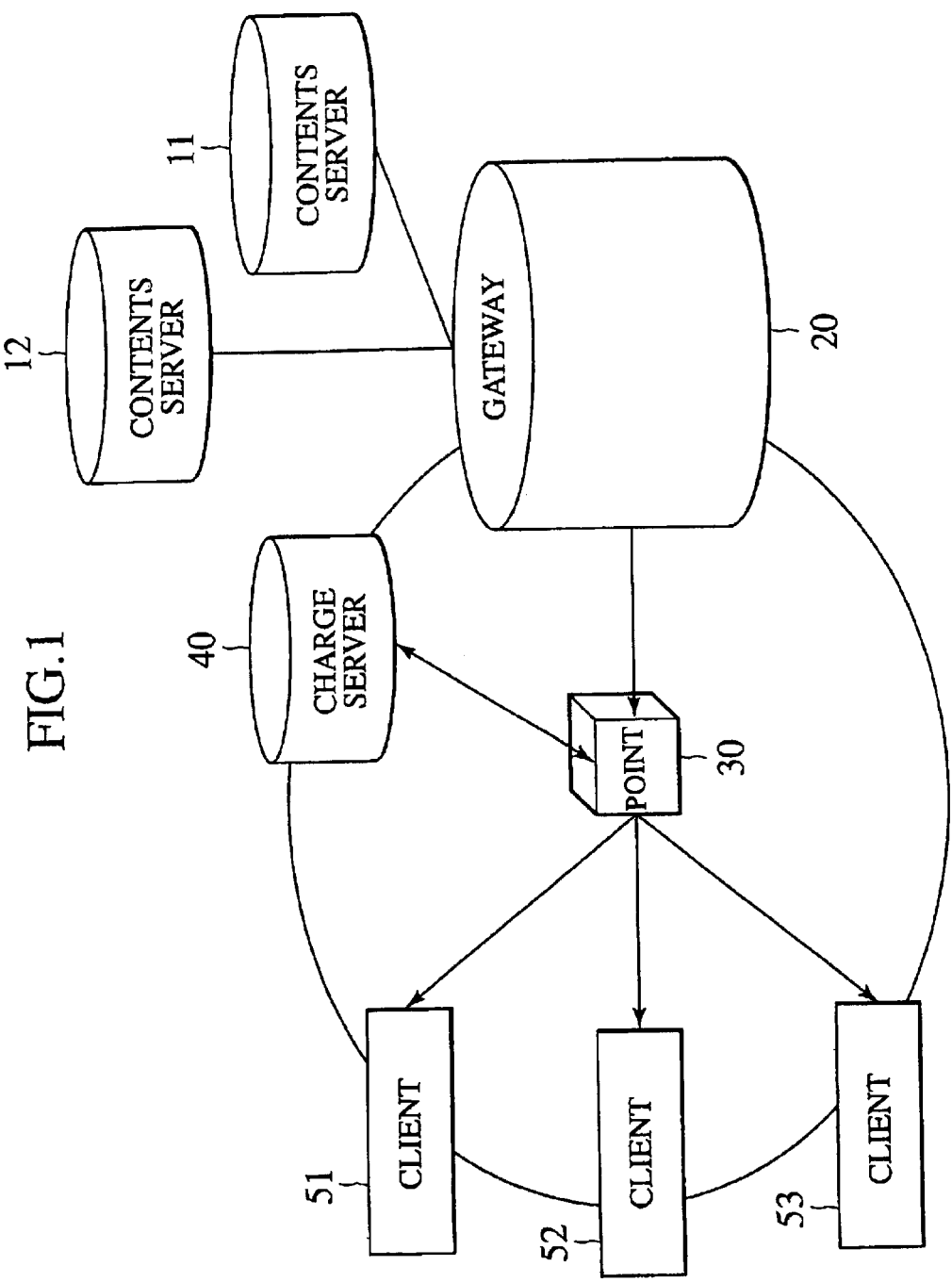
FIG. 1 is a general configuration diagram of a conventional communication data volume measuring system.
Figure 2:
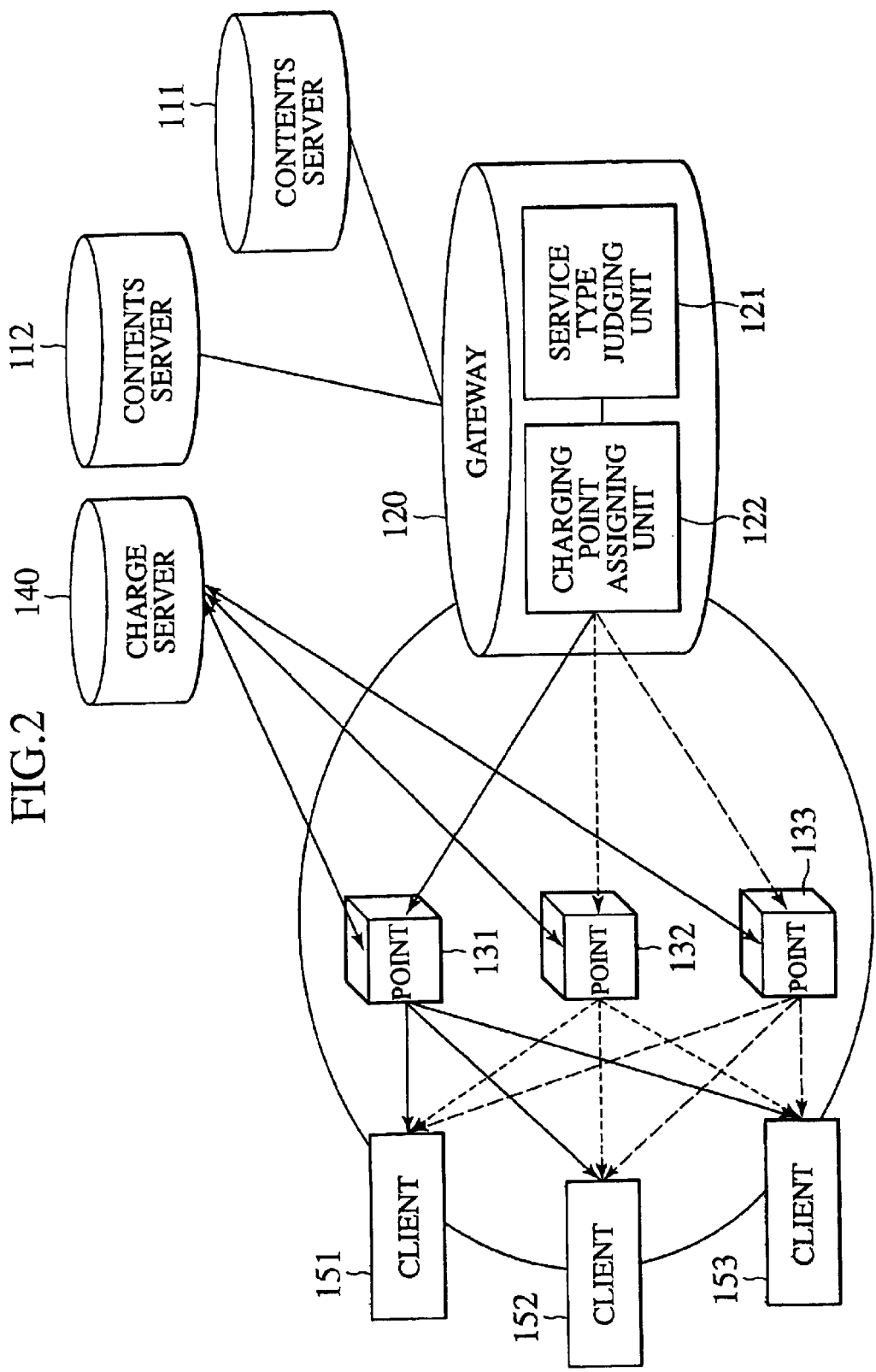
FIG. 2 is a general configuration diagram of a communication data volume measuring system in a first embodiment of the invention.
Figure 3:
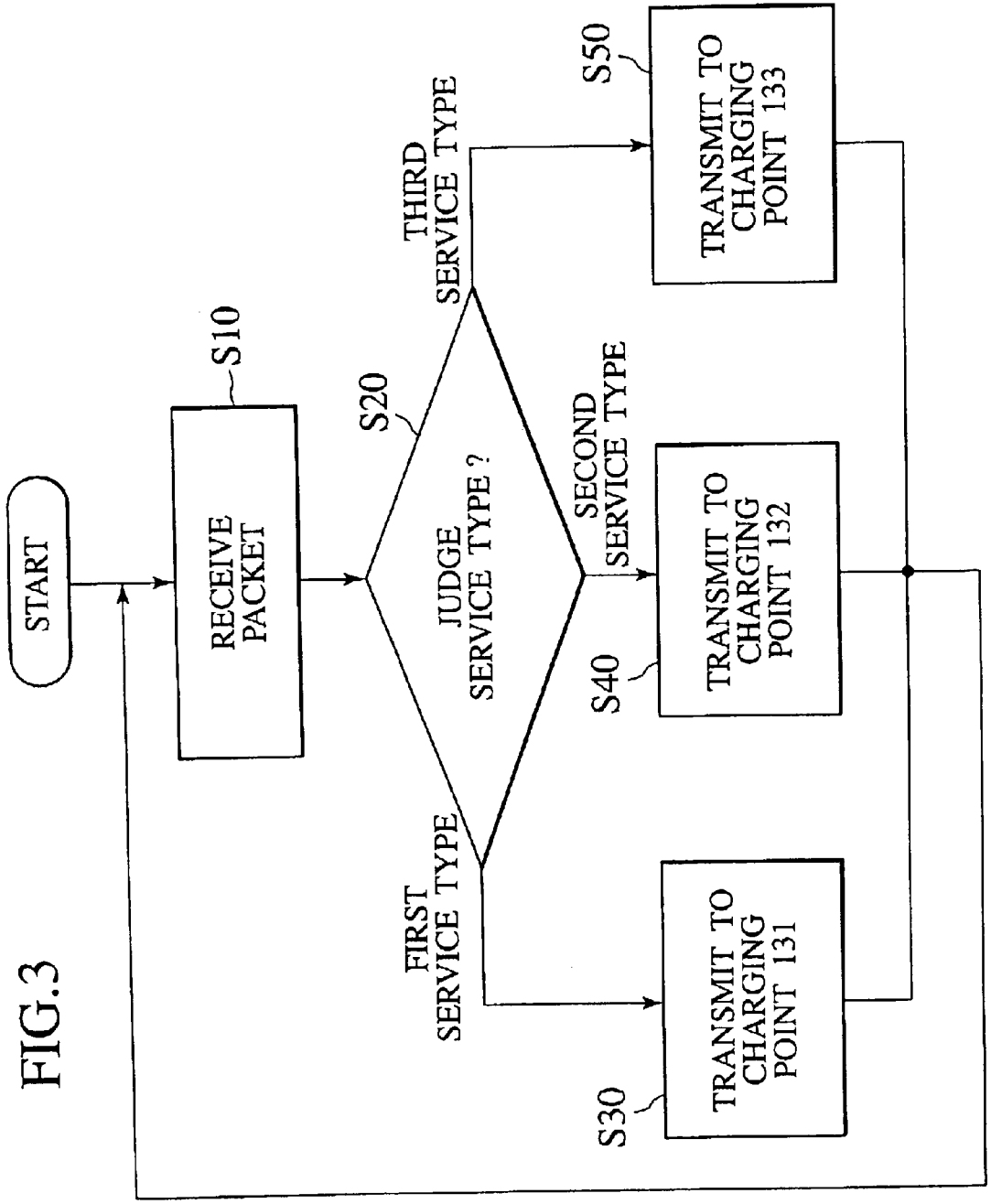
FIG. 3 is a flow chart showing operations of a gateway of the communication data volume measuring system in the first embodiment of the invention.

FIG. 2 is a general configuration diagram of a communication data volume measuring system according to a first embodiment of the invention, and FIG. 3 is a flow chart showing operations of a gateway of the communication data volume measuring system according to the first embodiment of the invention. A method of charging according to the first embodiment will now be described with reference to FIGS. 2 and 3.

As shown in FIG. 2, the communication data volume measuring system according to the first embodiment of the invention comprises contents servers 111, 112 for providing contents, a gateway 120, charging points 131 to 133, a charge server 140, and clients 151 to 153. The gateway 120 has a service-type judging unit 121 and a charging point assigning unit 122.

In the present embodiment, the charging points 131 to 133 constitute a plurality of measuring points for measuring a communication data volume, and the gateway 120 constitutes a data relaying apparatus for receiving data and transmitting the data to any of the plurality of measuring points (charging points 131 to 133).

The service-type judging unit 121 constitutes a service type-judging means for judging the service type of the received data. The charging point assigning unit 122 constitutes a measuring point determining means for determining the measuring point to which the data is to be transmitted from among the plurality of measuring points (charging points 131 to 133) based on the service type thus judged and a data transmission means for transmitting the data to the measuring point thus determined.

Further, each of the plurality of charging points 131 to 133 comprises a data receiving means for receiving (capturing) the data from the data relaying apparatus (gateway 120) and a communication data volume measuring means for measuring the communication data volume of the received (captured) data.

In the present embodiment, each of the charging points 131 to 133 relays the captured data from the gateway 120 to the clients 151 to 153 without terminating an HTTP protocol.

In the present embodiment, a plurality of charging points are provided in accordance with the number of service types, and a packet is assigned by the gateway 120 according to the service type thereof.

For example, let us assume the charging point 131 to be a charging point of a first service type, the charging point 132 to be a charging point of a second service type, and the charging point 133 to be a charging point of a third service type.

For example, let us consider a case in which the contents server 111 provides contents to the client 151. The contents server 111 transmits a packet including information such as the destination (client 151) and information on the service type to the gateway 120. Referring to the method of adding the service type, for example, it may be inserted as an HTTP (Hyper Text Transfer Protocol) extension header.

An example of an HTTP extension header indicating the service type is shown in FIG. 7.

FIG. 7A shows an HTTP extension header for charging a client. In such a case, as shown in FIG. 7A, the HTTP extension header includes service type information "1" that indicates a first service type for which the client is charged.

FIG. 7B shows an HTTP extension header for the case of free of charge data. In such a case, as shown in FIG. 7B, the HTTP extension header includes service type information "3" indicating a third service type that is free of charge.

FIG. 7C shows an HTTP extension header for charging a contents server. In such a case, as shown in FIG. 7C, the HTTP extension header includes service type information "2" that indicates a second service type for which the contents server is charged. In such a case, the HTTP extension header also includes contents server information "ABC" that identifies the contents server to be charged and contents identification information "DEFGHIJK" that identifies contents provided by the contents server (e.g., an IP address and URL).

For example, data (packets) provided by the contents server 111 include HTTP response data and Push-type distribution data.

Operations of the gateway 120 of the communication data volume measuring system according to the first embodiment of the invention will now be described with reference to FIG. 3.

When the gateway 120 receives a packet (S10), the service-type judging unit 121 judges the service type of the packet (S20). The charging point assigning unit 122 transmits the received packet to the charging point associated with the service type thus judged (S30 to S50). For example, when the service-type judging unit 121 judges the service type of the packet to be of the second service type, the packet is transmitted to the charging point 132.

The charging points 131 to 133 measure packet level communication data volumes. Specifically, the charging points 131 to 133 measure the communication data volumes of packets that they have relayed in order to charge for the relayed packets. Measured values are transmitted to the charge server 140, and the charge server 140 performs a charging process for the measured values thus received.

The packet is transmitted to the client 151 via any of the charging points 131 to 133.

Thus, the gateway 120 determines the charging point to relay the packet in accordance with the service type. This makes it possible to measure a communication data volume for each of the service types and to charge for each of the service types.

(Second Embodiment)

Figure 4:
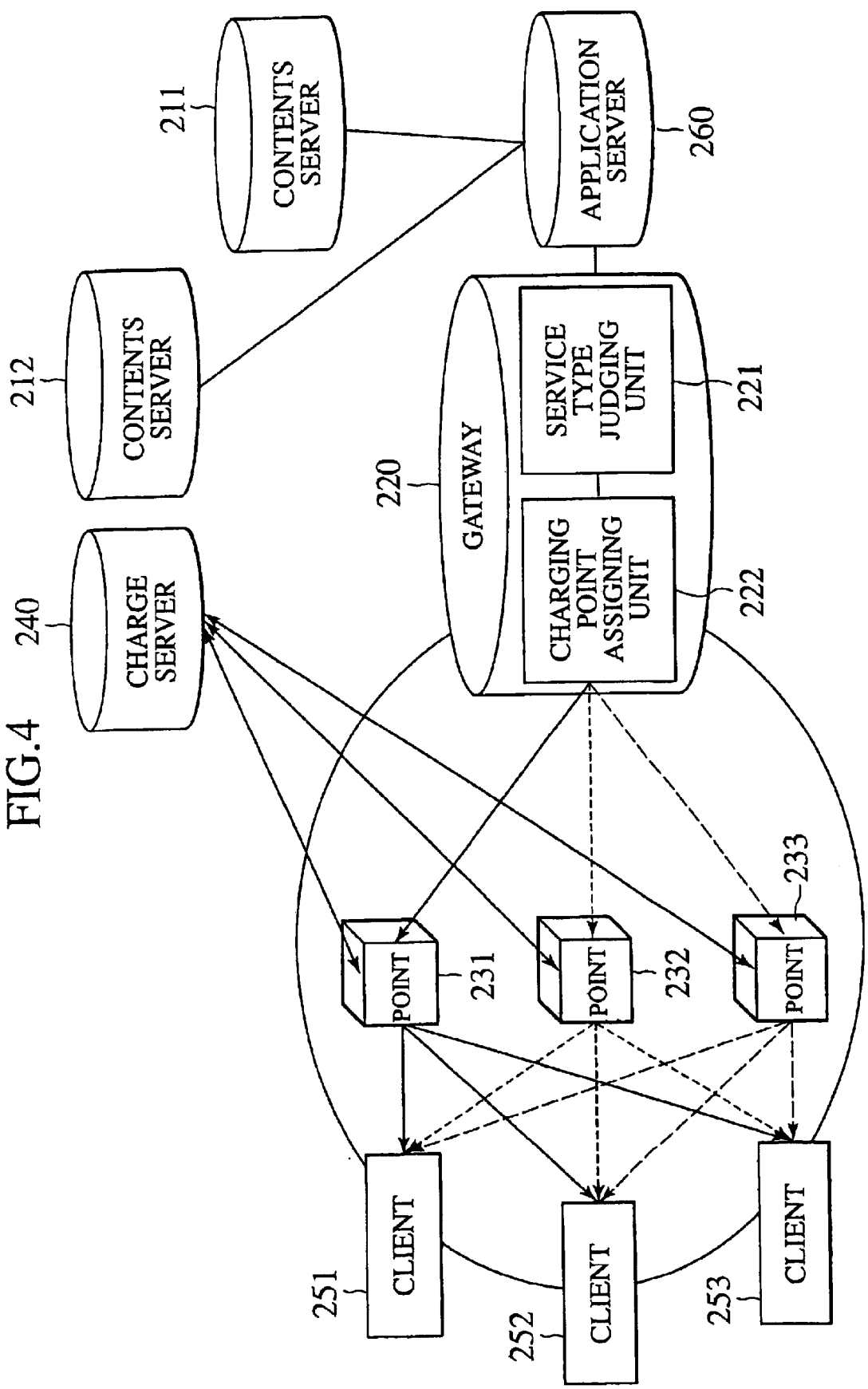
FIG. 4 is a general configuration diagram of a communication data volume measuring system in a second embodiment of the invention.
Figure 5:
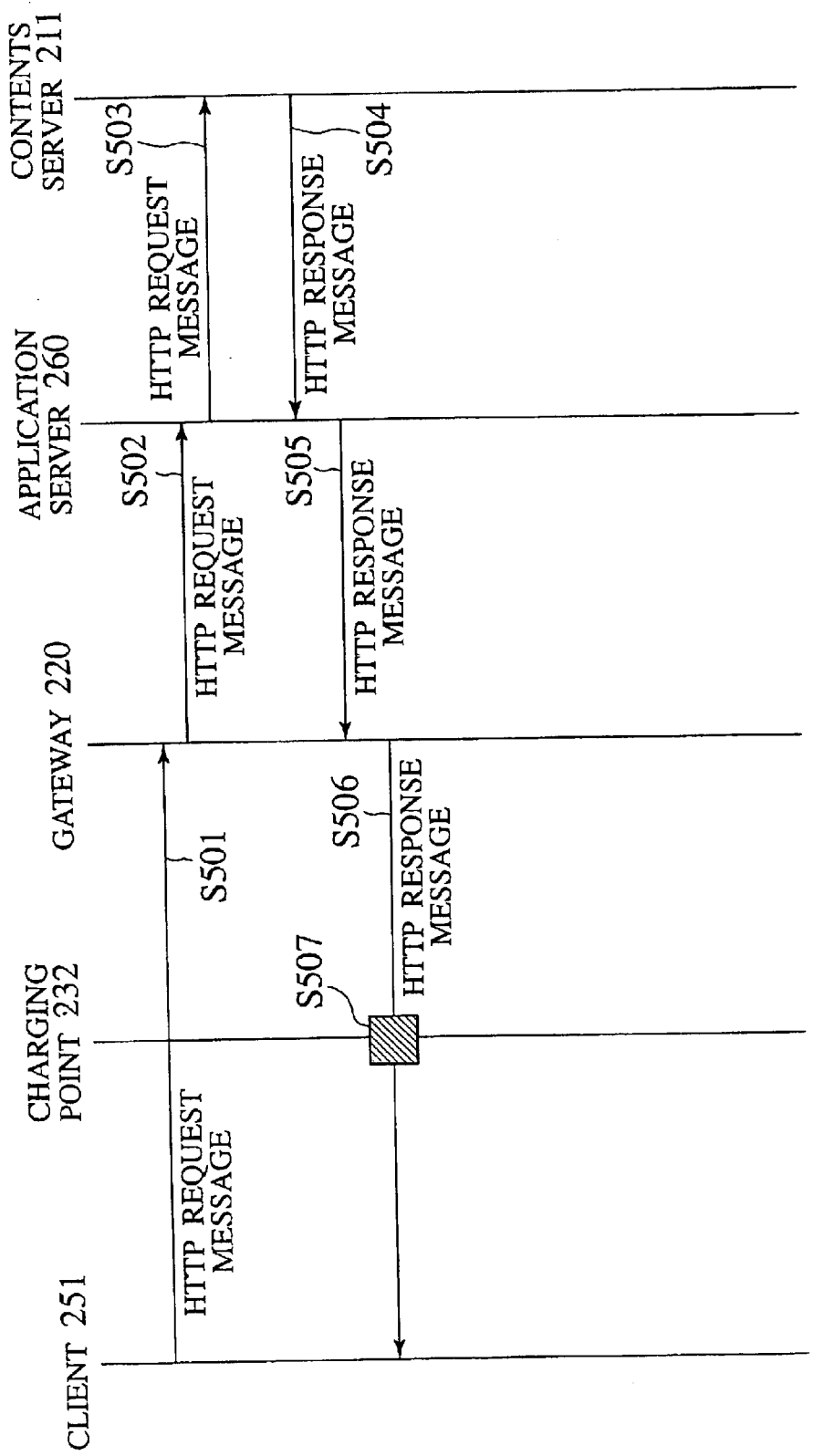
FIG. 5 is a time chart showing operations of the communication data volume measuring system in the second embodiment of the invention.
Figure 6:
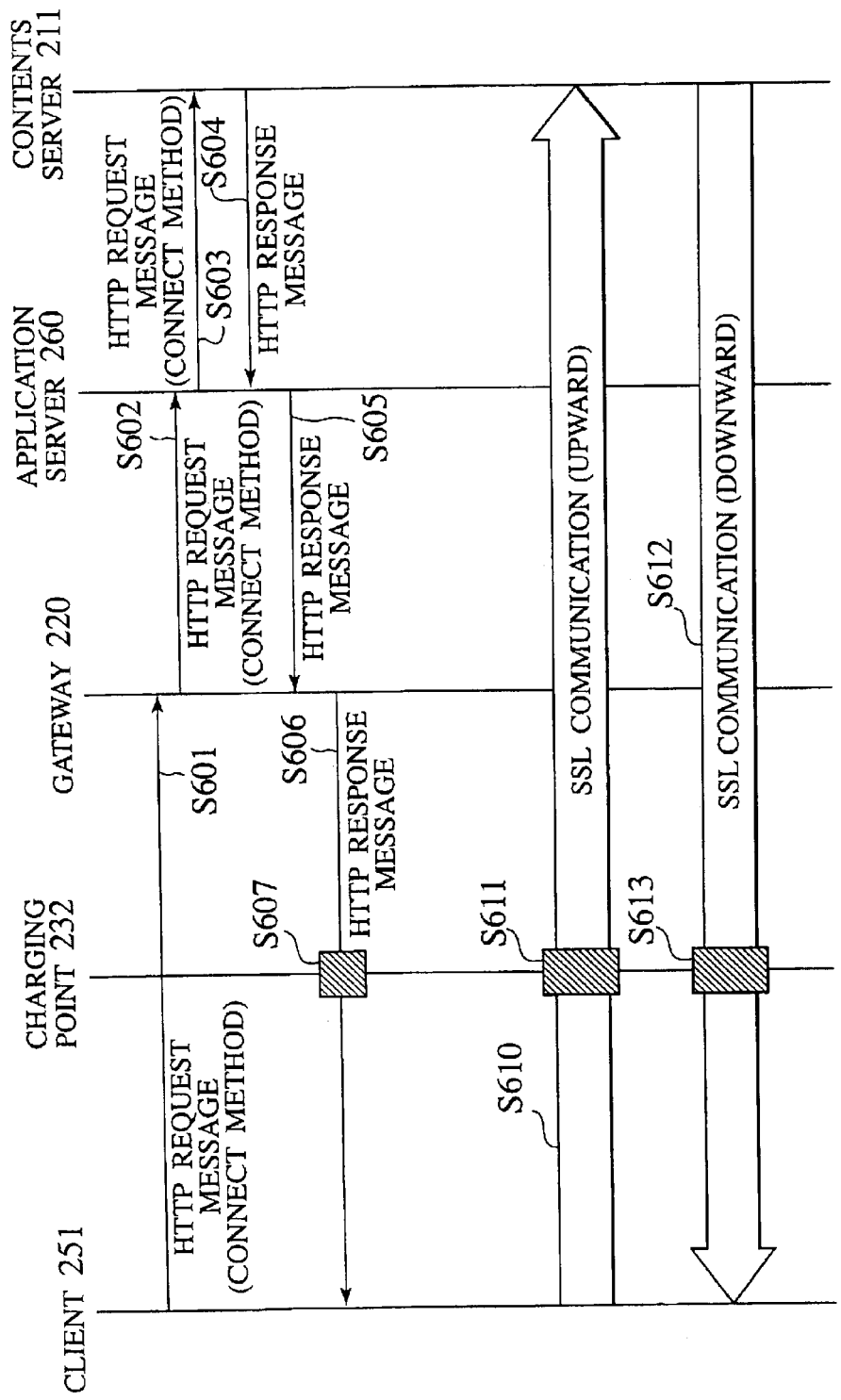
FIG. 6 is a time chart showing operations of the communication data volume measuring system in the second embodiment of the invention.

FIG. 4 is a general configuration diagram of a communication data volume measuring system according to a second embodiment of the invention, and FIGS. 5 and 6 are time charts showing operations of the communication data volume measuring system according to the second embodiment of the invention. A method of charging according to the second embodiment of the invention will now be described with reference to FIGS. 4 to 6.

As shown in FIG. 4, the communication data volume measuring system according to the second embodiment of the invention comprises contents servers 211, 212, a gateway 220, charging points 231 to 233, a charge server 240, clients 251 to 253, and an application server 260. The gateway 220 has a service-type judging unit 221 and a charging point assigning unit 222.

In the present embodiment, the application server 260 constitutes a server transmitting data to a data relaying apparatus (gateway 220).

The application server 260 has an adding means for adding HTTP extension headers indicating service types of data (e.g., a first service type for which a client is to be charged, a second service type for which a contents server is to be charged, and a third service type that is free of charge data).

For example, let us consider a case in which the contents server 211 provides contents to the client 251 through the charging point 232 using packet communication (HTTP protocol).

As shown in FIG. 5, the client 251 transmits an HTTP request message to the gateway 220 to request contents (data) from the contents server 211 (S501). The HTTP request message is transferred from the gateway 220 to the application server 260 (S502) and is further transferred to the contents server 211 (S503).

The contents server 211 transmits the data requested by the HTTP request message to the application server 260 as HTTP response message (S504).

As shown in FIG. 7, the application server 260 inserts service type information of the data in an HTTP extension header of the HTTP response message and transmits the same to the gateway 220 (S505).

The gateway 220 determines the charging point 232 as the party to which the HTTP response message is to be transmitted from among the plurality of charging points 231 to 233 based on the service type information inserted in the HTTP extension header and transmits the HTTP response message to the charging point 232 thus determined (S506).

The charging point 232 relays the HTTP response message to the client 251, captures the HTTP response message, and measures the communication data volume of the captured data (S507).

When data is transmitted using an SSL (Secure Socket Layer) communication (through a secure communication), the application server 260 can add an HTTP extension header indicating a service type to data (an HTTP response message) transmitted in response to an HTTP signal (an HTTP request message (CONNECT method)) requesting the start of the SSL communication.

While the "SSL communication" is used as a secure communication according to the present embodiment, the invention is not limited to such cases, and any secure communication may be used which is started by transmitting an HTTP signal (an HTTP request message (CONNECT method)).

For example, let us consider a case in which the contents server 211 provides contents to the client 251 via the charging point 232 using SSL communication (HTTP protocol).

As shown in FIG. 6, the client 251 transmits an HTTP request message using the CONNECT method to the gateway 220 as a signal (an HTTP signal) requesting the start of the SSL communication with the contents server 211 (S601).

The HTTP request message (CONNECT method) is transferred from the gateway 220 to the application server 260 (S602). Further, the application server 260 transfers the HTTP request message (CONNECT method) to the contents server 211 (S603).

The contents server 211 transmits an HTTP response message in response to the HTTP request message (CONNECT method) (S604).

As shown in FIG. 7, the application server 260 inserts service type information of the data to be provided by the contents server 211 in an HTTP extension header of the HTTP response message transmitted in response to the signal (HTTP request message (CONNECT method)) requesting the start of the SSL communication and transmits the same to the gateway 220 (S605).

The gateway 220 determines the charging point 232 as the party to whom the HTTP response message is to be transmitted from among the plurality of charging points 231 to 233 based on the service type information inserted in the HTTP extension header of the HTTP response message and transmits the HTTP response message to the charging point 232 thus determined (S606).

Specifically, communication ports for the SSL communication are provided between the client 251 and the gateway 220, between the gateway 220 and the application server 260, and between the application server 260 and the contents server 211.

The gateway 220 routes all data packets associated with the SSL communication so that they pass through the charging point 232.

The charging point 232 relays the HTTP response message to the client 251, captures the HTTP response message, and measures the communication data volume of the captured data (S607).

At this time, the gateway 220 and the application 260 open communication ports for relaying encrypted data and only relay data until the SSL communication is disconnected. During SSL communication, since data is encrypted, it is not possible to inform of the service type using an HTTP extension header.

When upward SSL communication takes place from the client 251 to the contents server 211 (S610), the charging point 232 can identify an IP address added to a data packet associated with the SSL communication to measure a communication data volume associated with the SSL communication (S611).

When downward SSL communication takes place from the contents server 211 to the client 251 (S612), the charging point 232 can identify an IP address added to a data packet associated with the SSL communication to measure a communication data volume associated with the SSL communication (S613).

The present embodiment is different from the first embodiment in that packets are transmitted from the contents servers 211, 212 to the gateway 220 through the application server 260.

(Third Embodiment)

Figure 8:
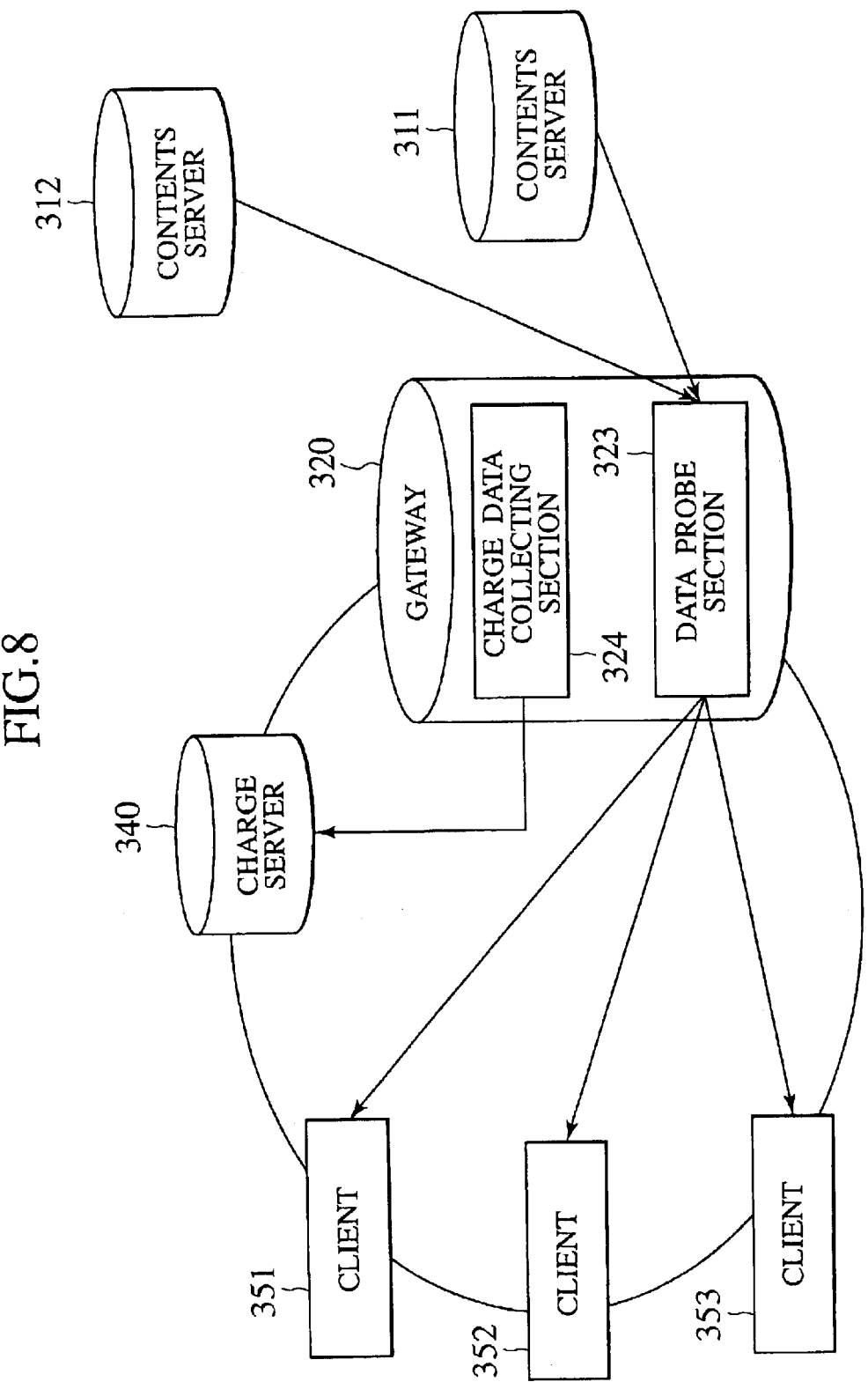
FIG. 8 is a general configuration diagram of a communication data volume measuring system in a third embodiment of the invention.
Figure 9:
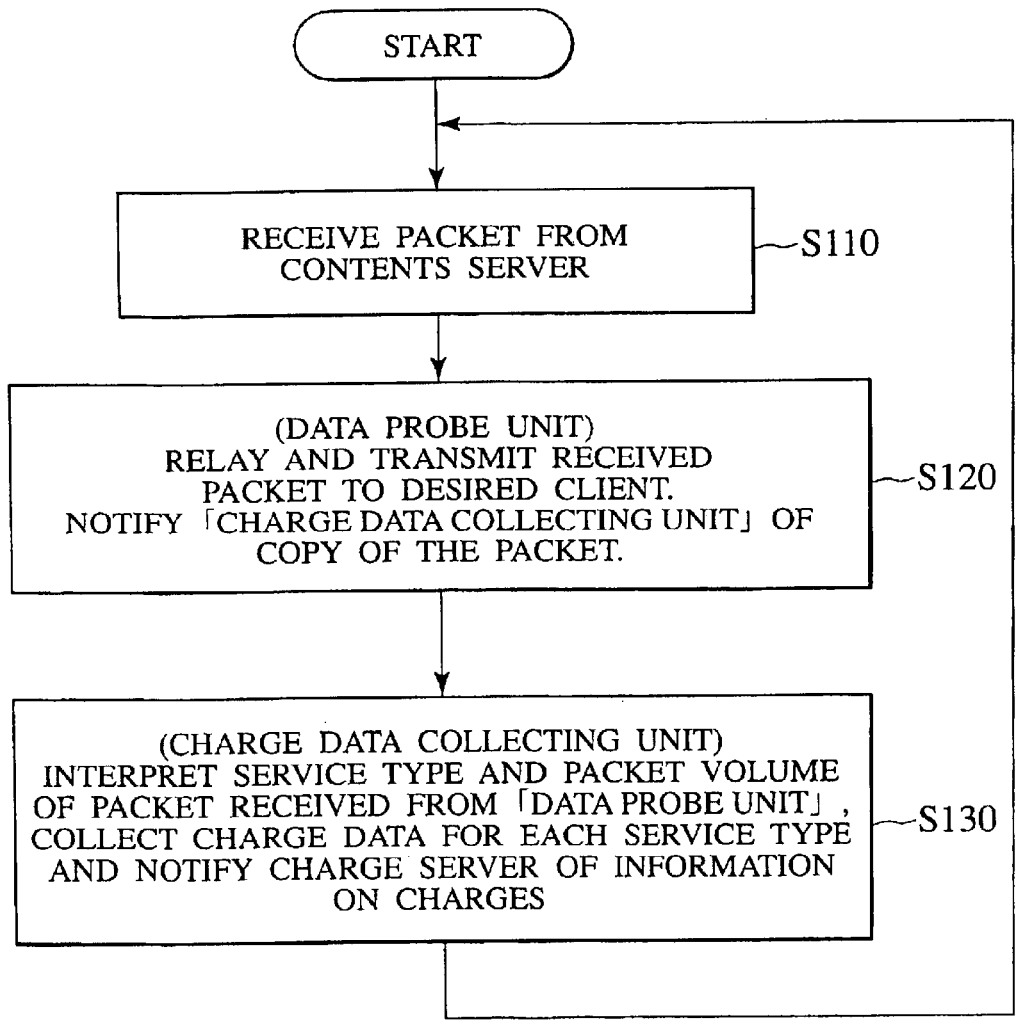
FIG. 9 is a flow chart showing operations of a gateway of the communication data volume measuring system in the third embodiment of the invention.
Figure 10:
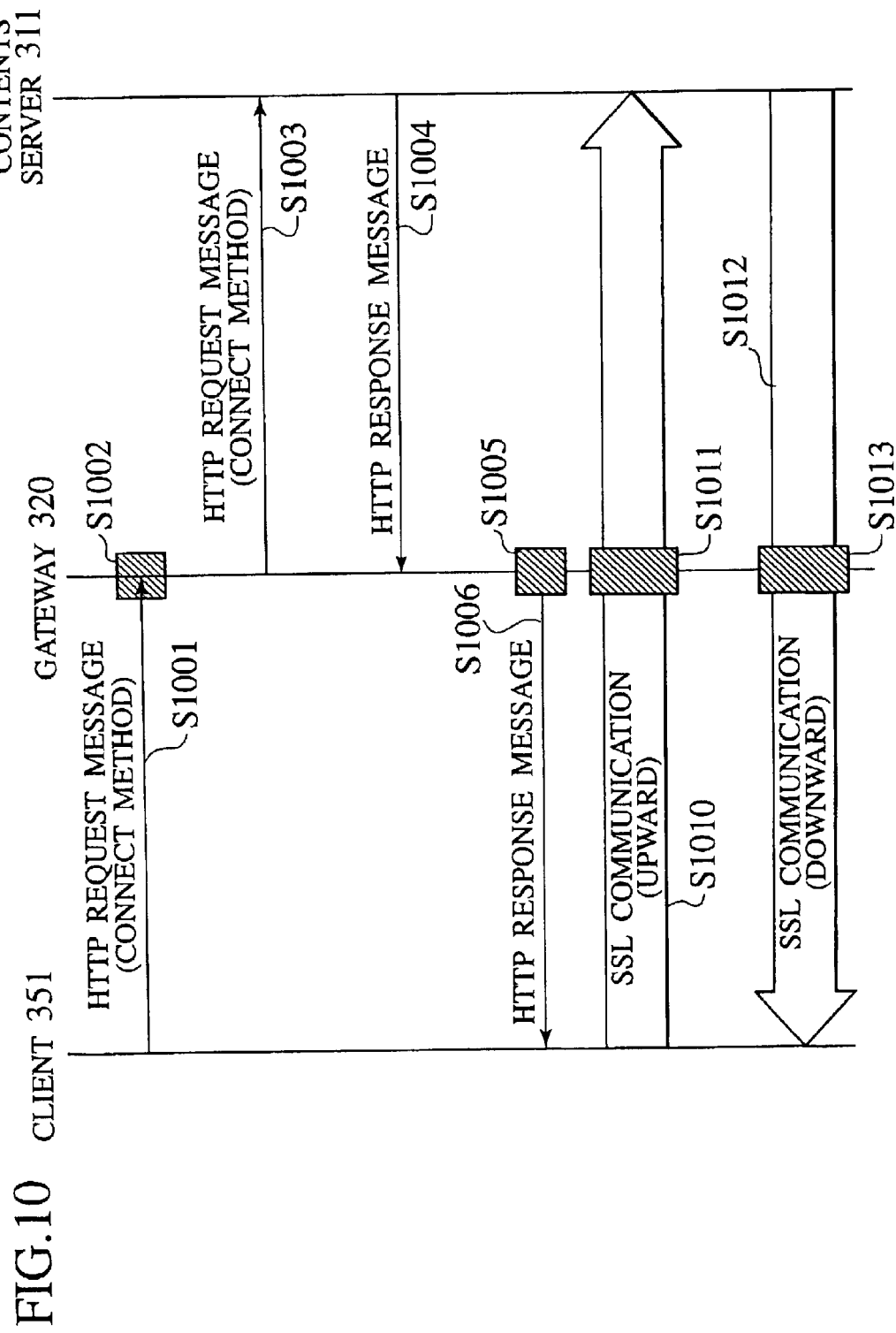
FIG. 10 is a time chart showing operations of the communication data volume measuring system in the third embodiment of the invention.

FIG. 8 is a general configuration diagram of a communication data volume measuring system according to a third embodiment of the invention; FIG. 9 is a flow chart showing operations of a gateway of the communication data volume measuring system according to the third embodiment of the invention; and FIG. 10 is a time chart showing operations of the communication data volume measuring system according to the third embodiment of the invention. A method of charging according to the third embodiment of the invention will now be described with reference to FIGS. 8 to 10.

As shown in FIG. 8, the communication data volume measuring system according to the third embodiment of the invention comprises contents servers 311, 312, a gateway 320, a charge server 340, and clients 351 to 353. The gateway 320 has a data probe unit 323 and a charge data collecting unit 324.

In the present embodiment, the gateway 320 includes functions of a charging point. The charge data collecting unit 324 of the gateway 320 directly communicates with the charge server 340 with regard to charges.

That is, in the present embodiment, the gateway 320 constitutes a data relaying apparatus that transmits and receives data and measures the communication data volume. The data probe unit 323 constitutes a service-type judging means for judging the service type of the received data, a communication data volume measuring means for measuring the communication data volume of the received data for each service type, and a data transmission means for transmitting data.

Operations of the gateway 120 of the communication data volume measuring system according to the third embodiment of the invention will now be described with reference to FIG. 9.

As shown in FIG. 9, when the gateway 320 receives data (a packet) addressed to a client from a contents server (S110), the data probe unit 323 relays and transmits the packet to the desired client (S120). Service type information may be deleted from the transmission this time because it is not necessarily required by the client. Further, the gateway 320 notifies the charge data collecting unit 324 of a copy of the packet.

The charge data collecting unit 324 interprets the packet volume (communication data volume) and service type of the packet received from the data probe unit 323 and combines them into information required for charging which is then notified to the charge server 340 (S130). The charge information may be collected for each service type, each user, each unit time, each content, and so on to allow the improvement of efficiency.

A method is possible in which the process of interpreting service types and packet volumes is performed at the data probe unit 323 in advance, in order to reduce the volume of data notified to the charge data collecting unit 324.

The gateway 320 may receive a packet from a contents server through an application server as in the second embodiment of the invention.

For example, let us consider a case in which the contents server 311 provides contents to the client 351 through the gateway 320 using SSL communication (HTTP protocol).

As shown in FIG. 10, the client 351 transmits an HTTP request message using the CONNECT method to the gateway 320 as a signal (an HTTP signal) requesting the start of the SSL communication with the contents server 311 (S1001).

The gateway 320 measures and stores the communication data volume of the HTTP request message (CONNECT method) (S1002) and transfers the HTTP request message (CONNECT method) to the contents server 311 (S1003).

The contents server 311 transmits an HTTP response message in response to the HTTP request message (CONNECT method) (S1004).

The gateway 320 measures the communication data volume of the HTTP response message transmitted in response to the signal (HTTP request message (CONNECT method)) requesting the start of the SSL communication (S1005) and relays and transmits the HTTP response message to the desired client 351 (S1006).

Specifically, the charge data collecting unit 324 of the gateway 320 judges the service type of the HTTP response message based on service type information inserted in an HTTP extension head of the HTTP response message and measures and stored the communication data volume of the HTTP response message for each of the service types.

The charge data collecting unit 324 of the gateway 320 can store the communication data volume of the HTTP request message (CONNECT method) measured at S1002 in association with the communication data volume of the HTTP response message.

Then, after the client 351 performs authentication and exchange of keys required for SSL communication with the contents server 311, encrypted data is transmitted and received.

At this time, the gateway 320 opens a communication port for relaying the encrypted data and only relays data until the SSL communication is disconnected. During SSL communication, since data is encrypted, a service type can not be notified using an HTTP extension header.

When upward SSL communication takes place from the client 351 to the contents server 311 (S1010), the gateway 320 can identify a communication port opened for the SSL communication to measure a communication data volume associated with the SSL communication (S1011).

When downward SSL communication takes place from the contents server 311 to the client 351 (S1012), the gateway 320 can identify a communication port opened for the SSL communication to measure a communication data volume associated with the SSL communication (S1013).

(Others)

Figure 11:
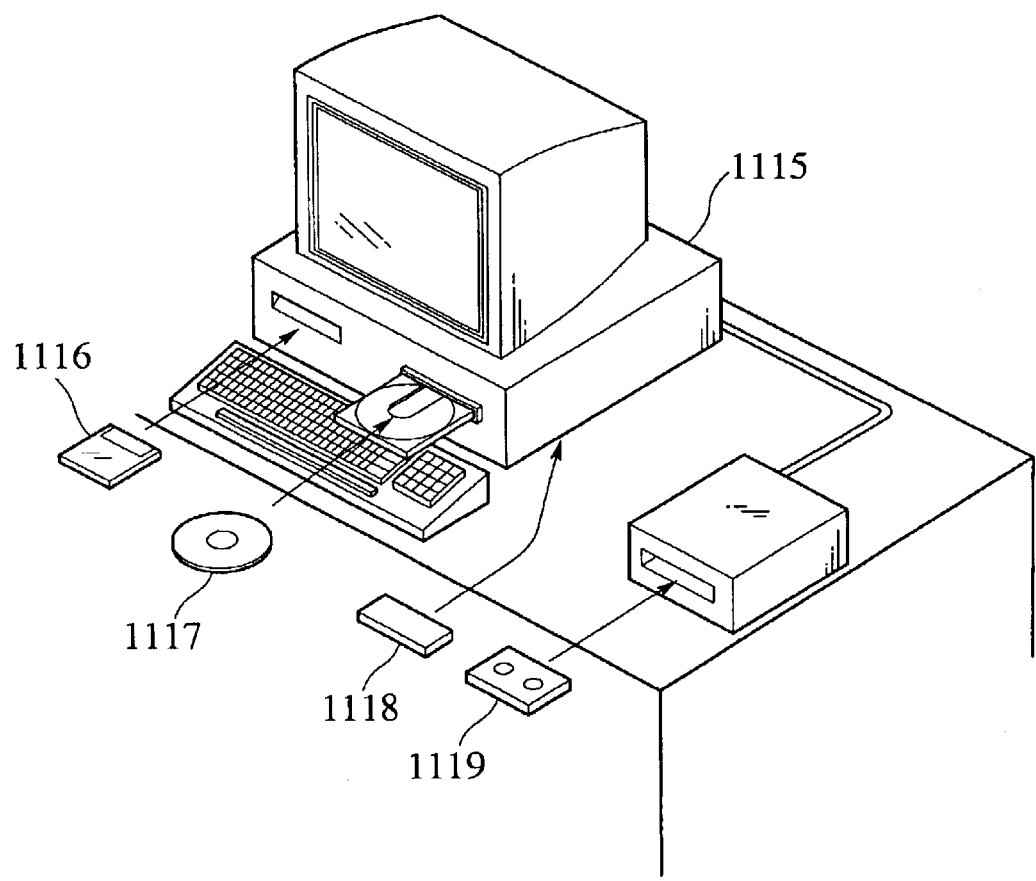
FIG. 11 shows a computer-readable recording medium in which a program according to the invention is recorded.

A program for causing a computer 1115 to execute the functions of the gateway 120, 220, 320, charging points 131 to 133, 231 to 233, and the like according to the present embodiment may be recorded in a computer-readable recording medium. As shown in FIG. 11, the computer-readable recording medium may be a floppy disk 1116, a compact disk 1117, an IC chip 1118, a cassette tape 1119, or the like, for example. A program can be easily stored, transported, sold, and so on with such a computer-readable recording medium on which the program is recorded.

Although the above description has referred to cases wherein the invention is applied to a charging process by way of example, the invention may be applied to the simple measurement of a communication data volume and the like.

Industrial Applicability

As described above, the invention makes it possible to measure a communication data volume for each service type when measuring it for a charging process and the like.

What is claimed is:

1. A communication data volume measuring system having a plurality of measuring points for measuring a communication data volume and a data relaying apparatus for receiving data and transmitting said data to any of said plurality of measuring points, wherein:

said data relaying apparatus comprises:

a service-type judging means for judging the service type of said received data;

a measuring point determining means for determining the measuring point to which said data is to be transmitted from among said plurality of measuring points based on said service type; and a data transmission means for transmitting said data to said determined measuring point, and each of said plurality of measuring points comprises:

a data receiving means for receiving said data from said data relaying apparatus; and a communication data volume measuring means for measuring the communication data volume of said received data.

2. The communication data volume measuring system according to claim 1, wherein:

a server for transmitting said data to said data relaying apparatus is provided;

said server comprises an adding means for adding an HTTP extension header indicating the service type of said data; and said service-type judging means of said data relaying apparatus judges said service type based on said HTTP extension header added to said received data.

3. The communication data volume measuring system according to claim 2, wherein, when said data is transmitted through a secure communication, said adding means of said server adds an HTTP extension header indicating said service type to data transmitted in response to an HTTP signal requesting the start of the secure communication.

4. A data relaying apparatus in a communication data volume measuring system comprising a plurality of measuring points for measuring a communication data volume and a data relaying apparatus for receiving data and transmitting said data to any of said plurality of measuring points, including:

a service-type judging means for judging the service type of said received data;

a measuring point determining means for determining the measuring point to which said data is to be transmitted from among said plurality of measuring points based on said service type; and a data transmission means for transmitting said data to said determined measuring point.

5. A data relaying apparatus for transmitting and receiving data and measuring a communication data volume, comprising:

a service-type judging means for judging the service types of said received data;

a communication data volume measuring means for measuring the communication data volume of said received data for each of said service types; and a data transmission means for transmitting said data.

6. A communication data volume measuring method in a communication data volume measuring system comprising a plurality of measuring points for measuring a communication data volume and a data relaying apparatus for receiving data and transmitting said data to any of said plurality of measuring points, comprising the steps of:

A) judging the service type of said received data at said data relaying apparatus;

B) determining the measuring point to which said data is to be transmitted from among said plurality of measuring points based on said service type at said data relaying apparatus;

C) transmitting said data to said determined measuring point from said data relaying apparatus; and D) measuring the communication data volume of said received data at said determined measuring point.

7. The communication data volume measuring method according to claim 6, further comprising a step of:

E) adding an HTTP extension header indicating the service type of said data at a server transmitting said data to said data relaying apparatus, wherein, in said step A), said data relaying apparatus judges said service type based on said HTTP extension header added to said data.

8. The communication data volume measuring method according to claim 7, wherein, in said step E), when said data is transmitted through a secure communication, said server adds an HTTP extension header indicating said service type to data transmitted in response to an HTTP signal requesting the start of the secure communication.

9. A data relaying method in a communication data volume measuring system comprising a plurality of measuring points for measuring a communication data volume and a data relaying apparatus for receiving data and transmitting said data to any of said plurality of measuring points, comprising the steps of:

F) judging the service type of said received data;

G) determining the measuring point to which said data is to be transmitted from among said plurality of measuring points based on said service type; and H) transmitting said data to said determined measuring point.

10. A data relaying method in a data relaying apparatus for transmitting and receiving data and measuring a communication data volume, comprising the steps of:

I) judging the service types of said received data;

J) measuring the communication data volume of said received data for each of said service types; and K) transmitting said data.

11. A program for causing a computer to execute the data relaying method according to claim 9 or 10.

12. A computer-readable recording medium on which a program for causing a computer to execute the data relaying method according claim 9 or 10 is recorded.

13. A communication data volume measuring system having a plurality of measuring points for measuring a communication data volume and a data relaying apparatus for receiving data and transmitting said data to any of said plurality of measuring points, wherein:

said data relaying apparatus comprises:

a service-type judgment unit configured to judge the service type of said received data;

a measuring point determining unit configured to determine the measuring point to which said data is to be transmitted from among said plurality of measuring points based on said service type; and a data transmission unit configured to transmit said data to said determined measuring point, and each of said plurality of measuring points comprises:

a data receiving unit configured to receive said data from said data relaying apparatus; and a communication data volume measuring unit configured to measure the communication data volume of said received data.

* * * * *

UNITED STATES PATENT AND TRADEMARK OFFICE
CERTIFICATE OF CORRECTION

| | |
|---|---|
| PATENT NO. | : 6,954,714 B2 |
| APPLICATION NO. | : 10/333738 |
| DATED | : October 11, 2005 |
| INVENTOR(S) | : Suzuki et al. |

Page 1 of 1

It is certified that error appears in the above-identified patent and that said Letters Patent is hereby corrected as shown below:

On the title page, the Terminal Disclaimer information should be deleted. Item (45) and the Notice information should read as follows:

--(45) Date of Patent: Oct. 11, 2005

(*) Notice:  Subject to any disclaimer, the term of this patent is extended or adjusted under 35 U.S.C. 154(b) by 57 days. --

Signed and Sealed this

Fifth Day of September, 2006

JON W. DUDAS
*Director of the United States Patent and Trademark Office*